Figure 3:
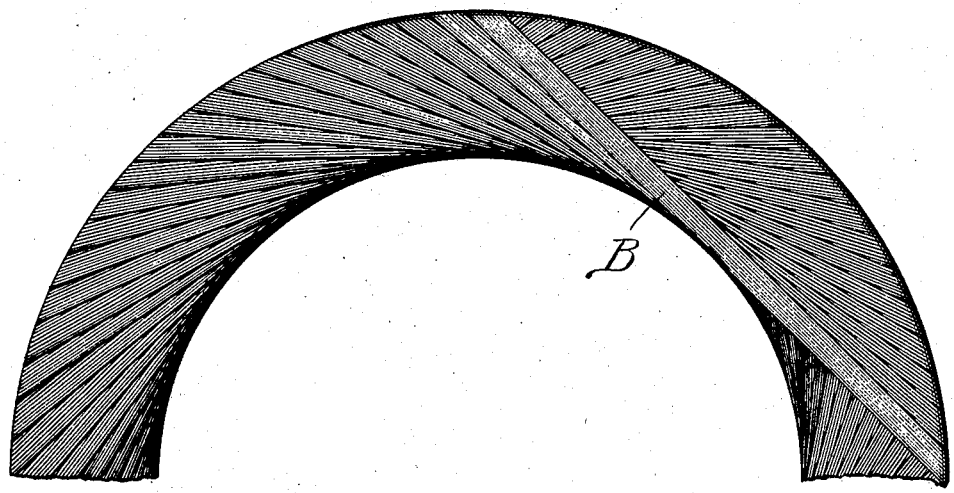

J. F. PALMER.
PNEUMATIC TIRE.
APPLICATION FILED MAR. 23, 1908.
924,572.
Patented June 8, 1909.
3 SHEETS—SHEET 1.
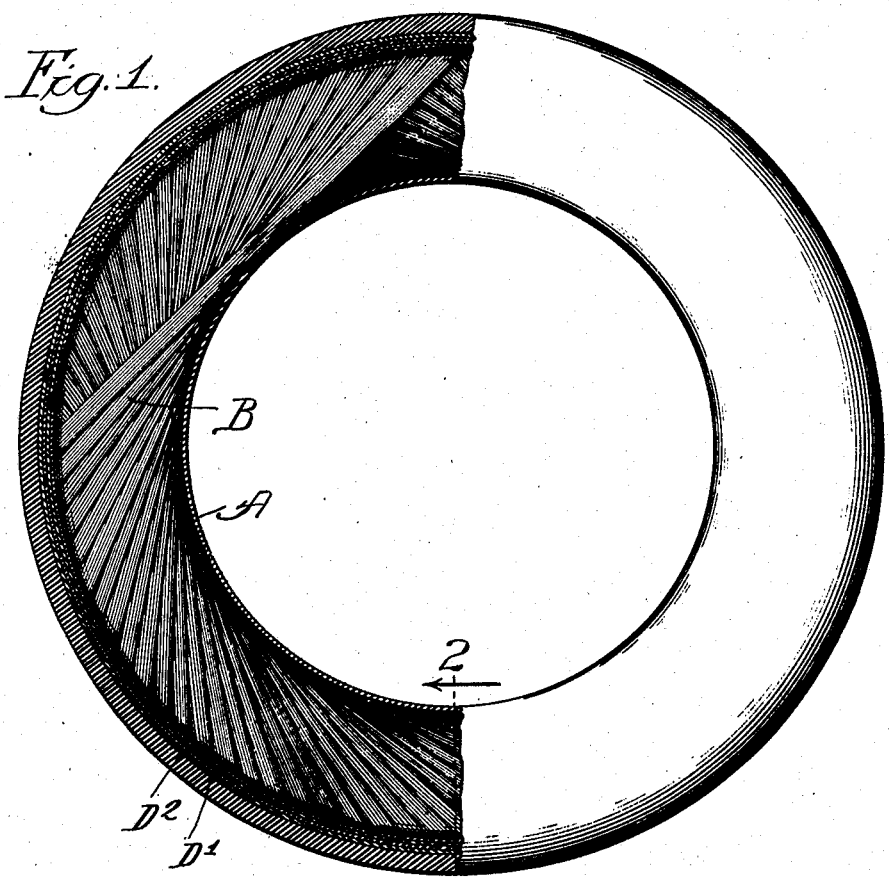
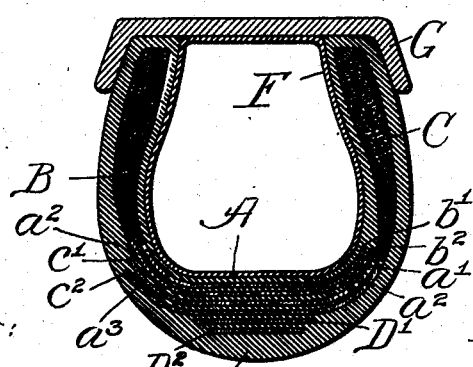
Witnesses:
John Enders
Chas. H. Buell
Inventor:
John F. Palmer:
By Sheridan & Wilkinson,
Attys.

J. F. PALMER.
PNEUMATIC TIRE.
APPLICATION FILED MAR. 23, 1908.

924,572.

Patented June 8, 1909.
3 SHEETS—SHEET 2.

Witnesses:
John Enders
Chas. H. Buell

Inventor:
John F. Palmer,
By Sheridan & Wilkinson
Attys.

J. F. PALMER.
PNEUMATIC TIRE.
APPLICATION FILED MAR. 23, 1908.

924,572.

Patented June 8, 1909.
3 SHEETS—SHEET 3.

Witnesses:
John Enders
Chas. H. Buell

Inventor:
John F. Palmer.
By Sheridan & Wilkinson
Attys

UNITED STATES PATENT OFFICE.

JOHN F. PALMER, OF CHICAGO, ILLINOIS.

PNEUMATIC TIRE.

No. 924,572.  Specification of Letters Patent.  Patented June 8, 1909.

Application filed March 23, 1908. Serial No. 422,731.

*To all whom it may concern:*

Be it known that I, JOHN F. PALMER, a citizen of the United States, residing at Chicago, in the county of Cook and State of Illinois, have invented certain new and useful Improvements in Pneumatic Tires, of which the following is a specification.

My invention relates in general to pneumatic tires, and more particularly to improved tire casings for inclosing an inner tube of the type of tires known as "double tube tires."

The object of my invention is to provide a tire casing which will possess maximum power-transmitting efficiency and which will at the same time be strong and durable.

It has been found in practice that tire casings first break and wear out at isolated points along parallel longitudinal lines at each side of the tread, due to inequality in tension of the individual members comprising the web or fabric, such breaking resulting from the supported weight flattening the tread and thereby forming sharp bends in the casing at each side of the tread, and also owing to the lateral displacement of the tire when traveling in a curved path, as, for instance, when the vehicle turns a corner. Such sharp bends in the casing tend to crush and wear the strain-resisting fabric, causing it to break along longitudinal lines at each side of the tread, and thereby destroying the casing. The life of a tire casing is consequently limited to the capacity of the strain-resisting fabric therein to withstand the wear and tear imposed thereon at each side of the tread.

In my improved tire casing the foregoing objections are obviated by forming the strain-resisting fabric on opposite sides of the casing in separate members. These members overlap the tread and are connected so as to permit them to move slightly laterally with respect to each other, such connection being perfectly effected by an interposed layer of rubber, although the ordinary frictioning of the fabric will accomplish this object to some degree. When the tire is flattened, either at both sides by the supported load, or at one side by reason of lateral displacement in turning a corner, such flattening of the side walls of the casing produces a lateral movement of the overlapped portions of the two side members, and thereby prevents the breaking of the fabric along the longitudinal lines at each side of the tread.

It is axiomatic that the more rigid the connections in a tire from the tread to the rim, the more efficiently will the power be transmitted. It is also axiomatic that the softer the tread of a tire the greater will be its cushioning quality and the more it will contribute to the easy riding of the vehicle. I accomplish these desirable results by providing the strain-resisting fabric in two separate side members which overlap the tread, thereby forming a rigid power-transmitting medium, while at the same time the tread is rendered relatively soft by reason of the elastic connection between the overlapping edges of the two fabric sections.

The preferred specific construction in which I have herein disclosed my invention may be generally described as a tire casing comprising a plurality of bands composed of substantially parallel strands which connect separate tread points and which, intermediate of the connected tread points, are tangential to a series of circles concentric with the inner edge of the casing. Each band extends across at its ends the tread of the casing, but does not extend on the opposite side of the casing to the inner edge thereof. A series of such bands are provided on each side of the casing, and are arranged progressively so as to form the strain-resisting web or fabric. A tire casing having the strain-resisting fabric therein formed in this manner efficiently transmits power from the rim of a wheel to the tread, by reason of the bands lying in a direction tangent from each rigid point adjacent the rim to corresponding points on the tread of the tire.

My invention will be more fully described hereinafter with reference to the accompanying drawings, in which—

Figure 4:
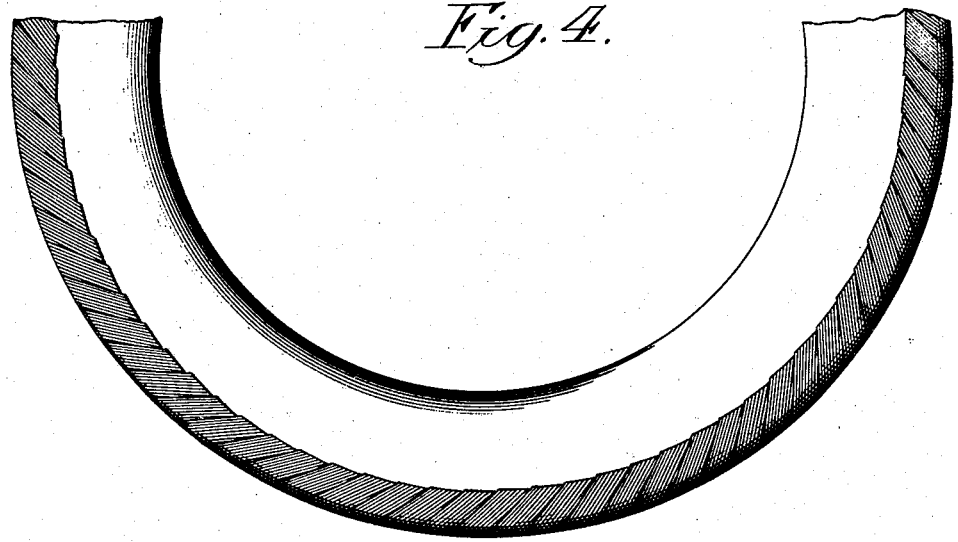
Figure 5:
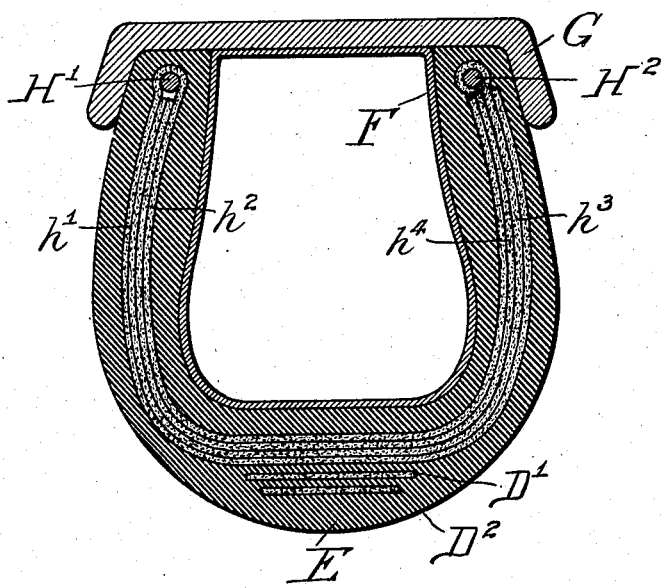
Figure 6:
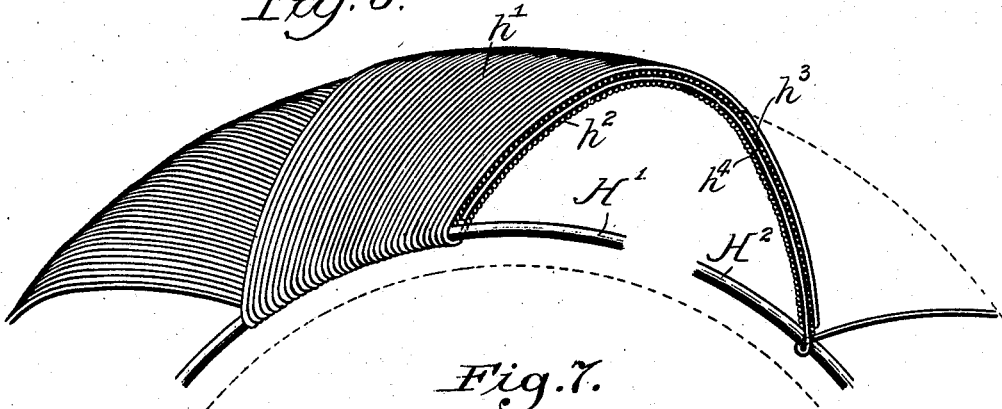
Figure 7:
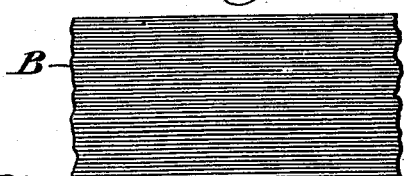

Figure 1 shows a tire casing partly in side elevation and partly in section; Fig. 2 a cross section on an enlarged scale through my improved casing and through a rim on which it is supported; Fig. 3 an elevational view showing the bands on one side of the casing; Fig. 4 a view of the opposite side of the casing showing the ends of the bands; Fig. 5 a cross section showing a modified arrangement of the strain-resisting fabric; Fig. 6 a detail view of the modification shown in Fig. 5; Fig. 7 an enlarged detail plan view of a portion of one of the bands; and Fig. 8 an enlarged sectional detail view of one of the bands.

The same reference characters are used to designate the same parts in the several figures of the drawings.

Reference letter A indicates an inner skin of the tire casing, which may be made of any suitable material, as, for instance, stockinet frictioned on one surface, or, in lieu of stockinet, rubber or canvas may be employed, or the inner skin may be entirely omitted.

Reference letter B indicates a series of bands located on one side of the casing, each of such bands extending tangentially to the inner edge of the casing and overlying the tread at its ends. The bands are arranged progressively, so as to form a strain-resisting web or fabric on one side of the casing and extend across the tread. The strain-resisting bands B are preferably composed of a plurality of parallel threads, such threads being placed upon the mandrel upon which the tire casing is formed, so as to form bands connected at their ends to points on the tread and intermediate of their ends located tangential to the inner edge of the casing, the several threads composing each band being tangent to circles concentric to the inner edge of the casing.

Reference letter C indicates a series of bands located on the opposite side of the casing from the bands B. The bands C are arranged in a manner similar to the bands B, and are preferably formed of the same material, viz., a plurality of parallel threads or strands. The bands C extend across the tread and terminate at their ends along the opposite side of the tread, as clearly shown in Fig. 2.

The ends of the bands B, which overlap the tread, are preferably separated into two layers, as shown by reference characters $b'$, $b^2$ in Fig. 2, a layer of rubber $a'$ being interposed between such layers. The ends of the bands C, which overlap the tread, are also preferably arranged in two layers $c'$ and $c^2$, between which is interposed a layer of rubber $a^3$. A layer of rubber $a^2$ is also interposed between the ends of the bands in the layer $b^2$ which overlie the tread and the ends of the bands in the layer $c'$, to permit a slight lateral movement between the overlapping ends of the bands B and C. The bands B as a whole constitute a longitudinal member of the strain resisting fabric separate from the longitudinal member of the strain resisting fabric composed of the bands C as a whole, such separate longitudinal members of the strain resisting fabric being slightly movable relatively to each other in a lateral direction. The rubber layers between the overlapping ends of the bands also serve to permit the bands to yield slightly, thereby equalizing any inequality of tension between the bands, and equally distributing the work of power-transmission throughout the web formed by the bands, so that all of the bands will be effective without causing any rupture, which might result from distortion or unequal tension in the bands forming the tire.

The bands may be arranged to form two or more individual longitudinal members, and when more than two of such members are provided, those extending from the opposite sides of the casing may be applied alternately in forming the tire, or two or more members may be applied first on one side and then on the other side, or two layers forming one member may be interlaced with or embrace the layers of the opposing member.

Reference characters $D'$ and $D^2$ indicate longitudinally wound bands extending around the tread of the casing and serving to connect and unify the underlying tangential bands B and C forming the two side members of strain-resisting fabric.

E designates the usual outer coating of rubber, which is applied around the strain-resisting fabric and is then vulcanized to form the tread of the casing.

Reference letter F indicates the usual inner tube of a double pneumatic tire, while reference character G designates a rim upon which the tire is supported. It will of course be understood that my invention may be embodied in other forms of tire casings than that herein illustrated, also that a tire casing embodying my invention may be supported upon any suitable construction of rim.

In Figs. 5 and 6 I have illustrated a modified arrangement of the strain-resisting fabric, in which the fabric is made of parallel threads, the threads of one layer of fabric crossing at an angle the threads of an adjacent layer or layers of fabric. In these figures reference characters $H'$ and $H^2$ indicate wires extending longitudinally of the casing within the inner edges thereof and around which the members of fabric extend. Reference characters $h'$ and $h^2$ indicate the layers of the members of the fabric which is folded around the wire $H'$, while reference characters $h^3$ and $h^4$ indicate the two layers of the member of the fabric extending around the wire $H^2$.

By reference to Fig. 6 it will be seen that the parallel threads in one layer of the strain-resisting fabric extend at an angle to the threads of the adjacent layer of fabric. In this modified arrangement of the side members of strain-resisting fabric the interposed layers of rubber may be omitted and the layers of fabric laid directly upon each other, inasmuch as the rolling tendency of the individual threads of the fabric will permit sufficient relative yielding of the members of fabric without the necessity of interposing layers of yielding material, such as rubber.

It will be observed that the interior cross section of the casing is normally flat around the periphery, so that the pressure of the air when the tire is inflated radially expands the casing, such radial expansion being resisted by the unifying peripheral windings D' and D², which are thereby placed under tension and more efficiently unify the periphery of the casing. These peripheral windings not only serve to unify the parallel threads of which the strain-resisting fabric is composed, but also to strengthen the tire by resisting the outward expansion of the tread of the casing when inflated.

It will also be observed that in my improved tire casing there would be a compensation for inequality of strain not only upon the separate longitudinal members of the strain-resisting fabric, but also a compensation for inequalities of tension in the threads or other material of which the separate members of the strain-resisting fabric are formed. This universal compensation for inequalities in tension so evenly distributes the tension upon the strain-resisting fabric that its durability is greatly increased owing to the elimination of the breaking of threads or strands subjected to greater tension than the other strands or threads or portions of the material of the strain-resisting fabric.

From the foregoing description it will be observed that I have invented an improved pneumatic tire, more particularly a tire casing, the strain-resisting fabric of which will not be broken when sharply bent at each side of the tread, owing to the fabric being formed in separate side members yieldingly connected where they overlap the tread, thereby dissipating the crushing and breaking strains which would otherwise rupture the fabric at each side of the tread.

It will further be observed that in its preferred form my improved tire possesses maximum power-transmitting efficiency by reason of the bands being in the form of cords connecting the tread points with an intermediate tangential point at the inner edge of the casing, thereby exerting a direct pull from each point on the rim to a point on the tread, and also forming a relatively soft tread contributing easy riding qualities.

I claim:

1. In a pneumatic tire, the combination with a tread covering, of a strain-resisting fabric comprising a plurality of separate longitudinal members elastically connected.

2. In a pneumatic tire, the combination with a tread covering, of a strain-resisting fabric comprising separate elastically-connected longitudinal members at each side of the tire and extending to and overlapping the tread.

3. In a pneumatic tire, the combination with a tread covering, of a strain-resisting fabric comprising a separate longitudinal member at each side extending to and overlapping the tread, and a layer of rubber interposed between and elastically uniting the overlapped tread portions of the members.

4. In a pneumatic tire, the combination with a tread covering, of a strain-resisting fabric comprising a plurality of separate elastically-connected longitudinal members, and a longitudinal unifying and strain-resisting winding around the tread.

5. A tire casing comprising strain-resisting bands, each connecting separate tread points and intermediate of the connected tread points tangent to the inner edge of the casing, the bands on opposite sides of the casing being separate and overlapped at the tread.

6. In a tire casing, the combination with a tread covering, of a strain-resisting fabric comprising bands, each connecting separate tread points and intermediate of the connected tread points lying tangent to the inner edge of the casing, the bands on opposite sides being separate and overlapped at the tread, and a longitudinal unifying winding extending around the tread.

7. In a pneumatic tire, the combination with a tread covering, of a strain-resisting web of bands composed of a plurality of substantially parallel threads which connect separate tread points and intermediate of the connected tread points are tangent to a series of circles concentric to the inner edge of the casing, the web of bands on the opposite sides of the casing being separate and overlapped on the tread.

8. In a pneumatic tire, the combination with a tread covering, of strain-resisting bands composed of a plurality of substantially parallel threads which connect separate tread points and intermediate of the connected tread points are tangent to a series of circles concentric to the inner edge of the casing, the bands on opposite sides of the casing being separate, and means for yieldingly connecting the bands on one side of the casing with those on the other side of the casing.

9. In a pneumatic tire, the combination with a tread covering, of a strain-resisting fabric comprising a plurality of separate elastically-connected longitudinal members movable with relation to each other, the fabric being composed of parallel independent threads, the threads in adjacent members crossing each other at an angle.

10. In a tire casing, the combination with a tread covering, of a strain resisting fabric comprising separate longitudinal members, and means for connecting said members to automatically compensate for inequalities of tension in the opposing members and in the material thereof.

11. In a tire casing, the combination with a tread covering, of a strain-resisting fabric composed of non-interwoven thread material forming separate longitudinal overlapping members, and means for connecting said members to automatically compensate for inequalities of tension in the opposing members and in the threads thereof.

In testimony whereof, I have subscribed my name.

JOHN F. PALMER.

Witnesses:
GEO. L. WILKINSON,
ANNIE C. COURTENAY.